United States Patent
Hartman et al.

(10) Patent No.: US 6,718,345 B2
(45) Date of Patent: Apr. 6, 2004

(54) RESUME STORAGE AND RETRIEVAL SYSTEM

(76) Inventors: Richard L. Hartman, 5205 N. Mulvaney Ct., Spokane, WA (US) 99212; Mary M. Hartman, 5205 N. Mulvaney Ct., Spokane, WA (US) 99212; Roy P. Massena, P.O. Box 8435, Spokane, WA (US) 99203

( * ) Notice: Subject to any disclaimer, the term of this patent is extended or adjusted under 35 U.S.C. 154(b) by 0 days.

(21) Appl. No.: 10/437,650

(22) Filed: May 13, 2003

(65) Prior Publication Data

US 2003/0195767 A1 Oct. 16, 2003

Related U.S. Application Data

(63) Continuation of application No. 10/121,247, filed on Apr. 10, 2002, now Pat. No. 6,564,188, which is a continuation of application No. 09/054,339, filed on Apr. 2, 1998, which is a continuation of application No. 08/597,359, filed on Feb. 8, 1996, now Pat. No. 5,758,324.

(60) Provisional application No. 60/008,700, filed on Dec. 15, 1995.

(51) Int. Cl.⁷ .............................................. G06F 17/30
(52) U.S. Cl. .................... 707/104.1; 707/102; 707/513; 709/205; 709/206; 705/1
(58) Field of Search ......................... 707/104.1, 103 R, 707/102, 513; 705/1; 709/205, 206

(56) References Cited

U.S. PATENT DOCUMENTS

| | | | |
|---|---|---|---|
| 5,164,897 A | 11/1992 | Clark et al. | 364/401 |
| 5,675,507 A | 10/1997 | Bobo, II | 709/206 |
| 5,724,508 A | 3/1998 | Harple, Jr. et al. | 709/205 |
| 5,727,156 A | 3/1998 | Her-Hoyman et al. | 395/200.49 |
| 5,729,637 A | 3/1998 | Nicholson et al. | 382/282 |
| 5,737,599 A | 4/1998 | Rowe et al. | 707/104.1 |
| 5,742,762 A | 4/1998 | Scholl et al. | 395/200.3 |
| 5,758,324 A | 5/1998 | Hartman et al. | 705/1 |
| 5,781,785 A | 7/1998 | Rowe et al. | 707/513 |
| 5,832,497 A | 11/1998 | Taylor | 707/104.1 |
| 5,845,299 A | 12/1998 | Arora et al. | 707/513 |
| 5,892,905 A | 4/1999 | Brandt et al. | 395/187.01 |
| 5,978,758 A | 11/1999 | Ono | 705/1 |
| 5,999,939 A | 12/1999 | De Hilster et al. | 707/102 |

OTHER PUBLICATIONS

Nebel et al., "Request for Comments: 1876", Xerox Corporation (pp. 1–13 (Nov. 1995).
Callaway, Erin, "High Tech Hunt", *Computerworld*, p. 115 (Nov. 21, 1994).
Scheier, Kevin, "Intellimatch Introducing Newest Recruitment Tool Since the PC", *Business Wire*, Oct. 19, 1994.
"Using Restrac Sccanner With Restrac Hire and Restract Plan", *Restrac User Manual*, Release 1.2, pp. 3–1 (1985).
"Using the Rescruiting Workbench", *Restrac User Manual*, Restrac Hire 3.1, pp. 5–2 & 6–3, (1996).

*Primary Examiner*—Charles Rones
(74) *Attorney, Agent, or Firm*—Wells St. John P.S.

(57) ABSTRACT

A method of and apparatus for storage and retrieval of resumé images in a manner which preserves the appearance, organization, and information content of the original document. In addition, summaries or "outlines" of resumé images, broken down into multiple fields, are stored, and can be searched field by field. A user interface is provided which is based on a familiar paper-based method already in common use, thus reducing the training required to effectively use the system.

11 Claims, 14 Drawing Sheets

| PERSONAL INFORMATION | ~31~ | | ~31~ |
|---|---|---|---|
| NAME: | ~39~ | ~41~ | ~42~ |
| | FIRST | MIDDLE | LAST |

ADDRESS: ~44~

~32~

| | ~46~ | ~48~ | ~50~ |
|---|---|---|---|
| | CITY | STATE/PROVINCE | ZIP/POSTAL CODE |

PHONE: ~52~   FAX: ~54~

EMAIL: ~56~ ◄— 31

---

OPTIONAL INFORMATION  ⌐58  ⌐60  ⌐62

~34~   CITIZENSHIP: ☐ US   ☐ CANADA   ☐ OTHER, SPECIFY: ~64~

SECURITY CLEARANCE: ☐ PAST —66   ☐ PRESENT —68

SOCIAL SECURITY #: ~70~ ◄—31

---

POSITION DESIRED  —31

JOB TITLE: ~72~  ⌐76  ⌐78  ⌐80

~36~  74⌐TYPE: ☐ FT PERM.  ☐ FT TEMP.  ☐ PT PERM.  ☐ PT TEMP.

COMPENSATION: $ ~82~  PER ☐ WEEK  ☐ MONTH  ☐ YEAR

DATE AVAILABLE: ~90~ ◄—31  —84  —86  —88

---

EDUCATION

~38~   MAJOR   DEGREE   INST. NAME   CITY, STATE/PROVINCE   98⌐GPA

| HIGH SCHOOL: | 31—► | ~94~ | ~96~ | |
|---|---|---|---|---|
| COLLEGE: | ~100~ | ~102~ | ~104~ | ~106~ | |

---

EMPLOYMENT HISTORY (REPEAT AS NEEDED)   108

| EMPLOYER NAME: | ~110~ | |
|---|---|---|
| EMPLOYER CITY, STATE: | ~111~ | ~112~ |
| JOB TITLE: | ~114~ | |
| ~40~  START DATE: | ~116~   END DATE: ~118~ | |
| SUPERVISOR NAME: | ~120~ | |

SUBMIT —122   124— CLEAR

146 — VOCABULARY ASSISTANCE

FIG. 3I   ◄—30

| PERSONAL INFORMATION | ~31~ | | ~31~ |
|---|---|---|---|
| | ~46~ | ~48~ | ~50~ |
| | CITY | STATE/PROVINCE | ZIP/POSTAL CODE |

OPTIONAL INFORMATION ~58~ ~60~ ~62~
CITIZENSHIP: ☐ US ☐ CANADA ☐ OTHER, SPECIFY: [~64~]
SECURITY CLEARANCE: ☐ PAST ~66~ ~68~ ☐ PRESENT
~31~

POSITION TO BE FILLED ~31~
JOB TITLE: [~72~] ~76~ ~78~ ~80~
74 ~ TYPE: ☐ FT PERM. ☐ FT TEMP. ☐ PT PERM. ☐ PT TEMP.
COMPENSATION: [$ ~82~] PER ☐ WEEK ☐ MONTH ☐ YEAR
DATE NEEDED: [~90~] ~31~ ~84~ ~86~ ~88~

EDUCATION
                                                                     CITY,   MIN.
             MAJOR  DEGREE  INST. NAME  STATE/PROVINCE  GPA
HIGH SCHOOL:                 [~94~]  [~96~ 98]
COLLEGE: [~100~] [~102~] [~104~] [~106~]
108

EMPLOYMENT HISTORY ~31~
EMPLOYER NAME: [~110~]
EMPLOYER CITY, STATE: [~111~] [~112~]
JOB TITLE: [~114~]
MIN. MO. EXPERIENCE: [ ] ~31~
SUPERVISOR NAME: [~120~]

[SEARCH] ~142~ ~144~ [CLEAR]
148 — [VOCABULARY ASSISTANCE]

```
CITY, ST: WASHINGTON, DC
SECURITY: CURRENT
DESIRED: MATERIALS SPECIALIST
TYPE: FULL TIME PERMANENT
COMP: $6000 PER MONTH
AVAILABLE: JULY 1996
COLLEGE: MASS. INSTITUTE OF TECH.
COLLEGE GPA: 3.5
EMPLOYER: DEPARTMENT OF DEFENSE
JOB TITLE: MATERIALS RADIOLOGIST
```

JOHN DOE 619-555-1212 (VOICE)
1234 ANY STREET 619-555-1211 (FAX
SMALLTOWN CA 92041 JDOE@CELLSAT.COM (EMAIL)

CAREER
SUMMARY
    *15 YEARS OF IN-DEPTH INDUSTRY EXPERIENCE*

FIRMWARE DESIGN: INTEL (8048, 8051, 80960, 80X86); MOTOROLA (680X); ASSEMBLY AND C/C++; NETWARE, IBM PC.

SYSTEM DESIGN: SOFTWARE/HARDWARE ARCHITECTURE; COMMAND SET DESIGN; LOCAL AREA NETWORKS; ERGONOMICS; SPACE-QUALIFIED SYSTEMS (MIL-38510 SPACE FLIGHT DESIGN RULES).

CIRCUIT DESIGN: DIGITAL, AUDIO, AND VIDEO CIRCUITRY; LOW NOISE; LOW DISTORTION; CROSSTALK SENSITIVE.

OCCUPATIONAL
EXPERIENCE
    *CELLULAR SATELLITE CORPORATION*
        *SAN DIEGO CA*

MAR 88–PRESENT  MANAGER OF SATELLITE SOFTWARE DEVELOPMENT: MANAGE DEPARTMENT, RESPONSIBLE FOR ALL EARTH-TO ORBIT LINKUP FIRMWARE, HOST INTERFACE, PROTOCOLS, ETC.

JUL 87  SUPERVISOR OF CELLULAR FIRMWARE ENGINEERING: SUPERVISED FIRMWARE DESIGN INCLUDING OS ARCHITECTURE, CELL ROUTING, AND DROPPED LINK HANDLING DATA COMPRESSION AND ENCRYPTION.

FIG. 7

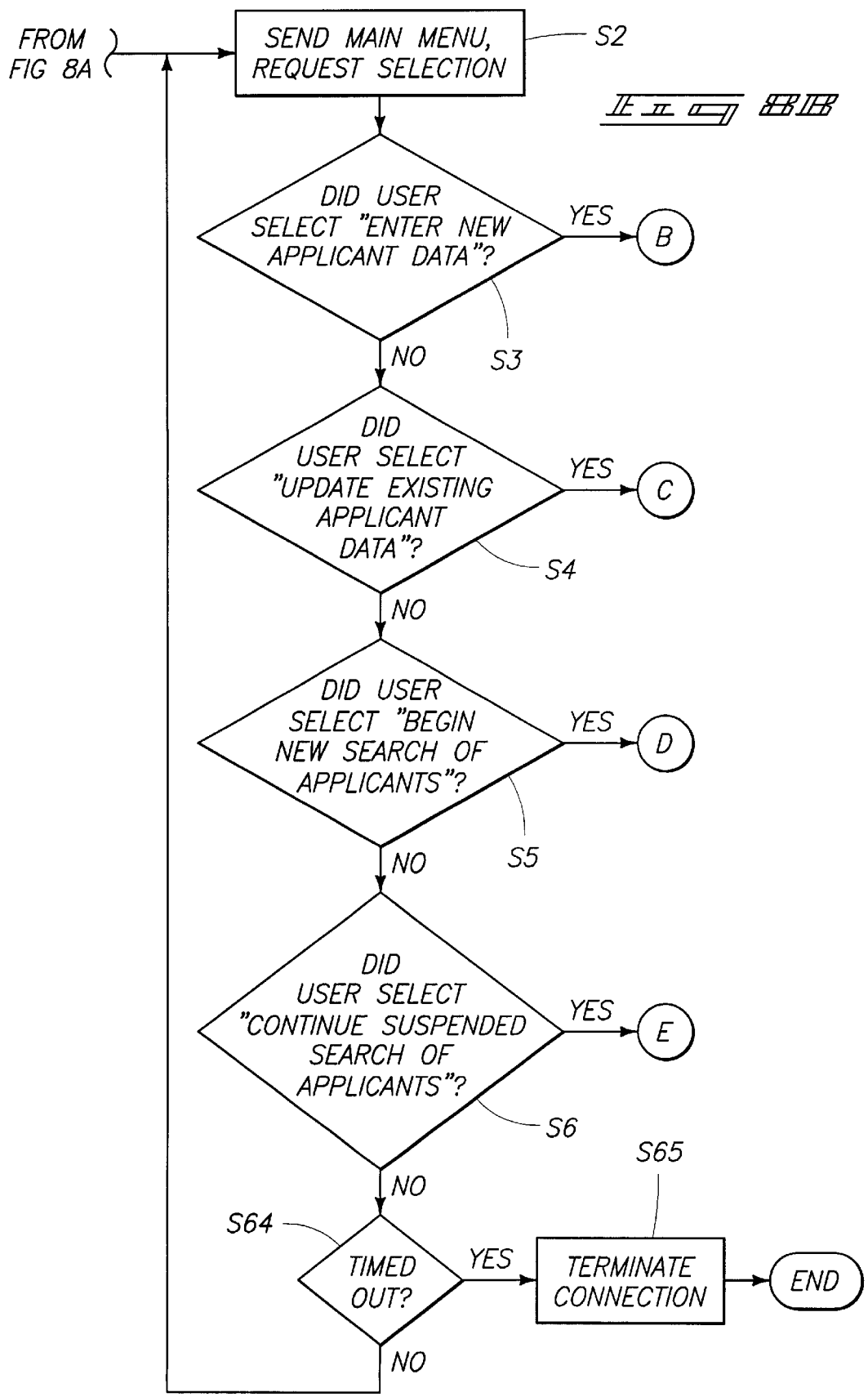

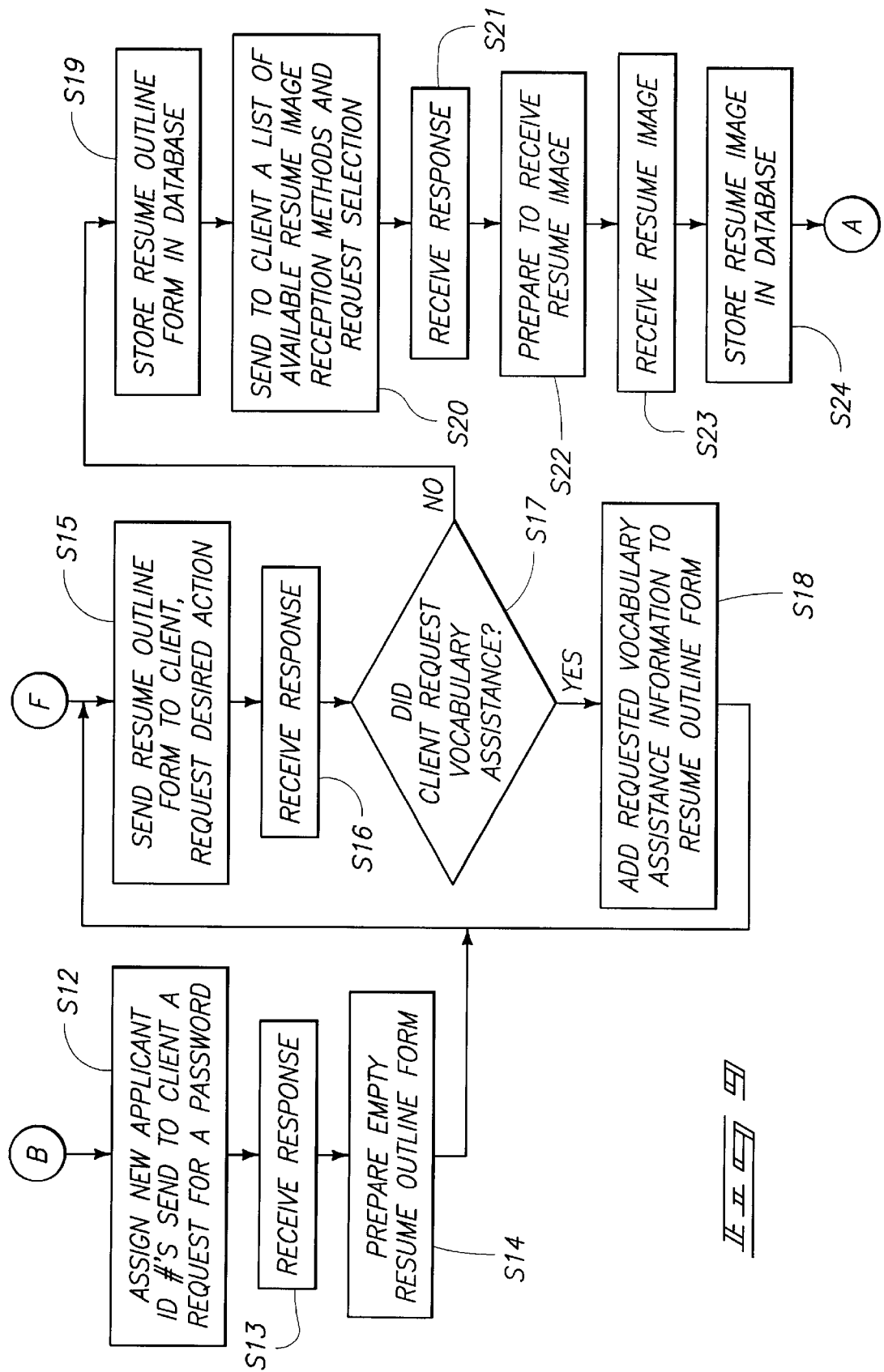

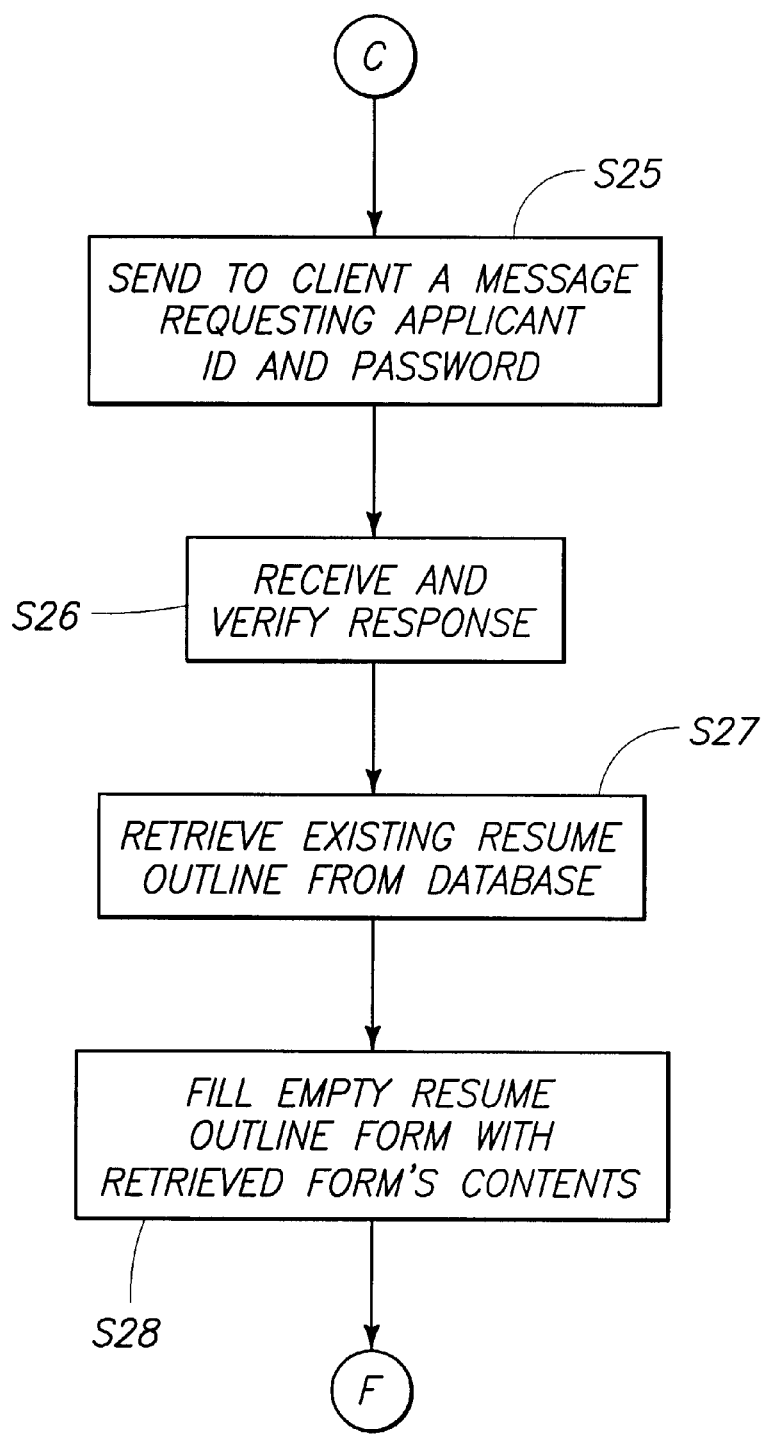

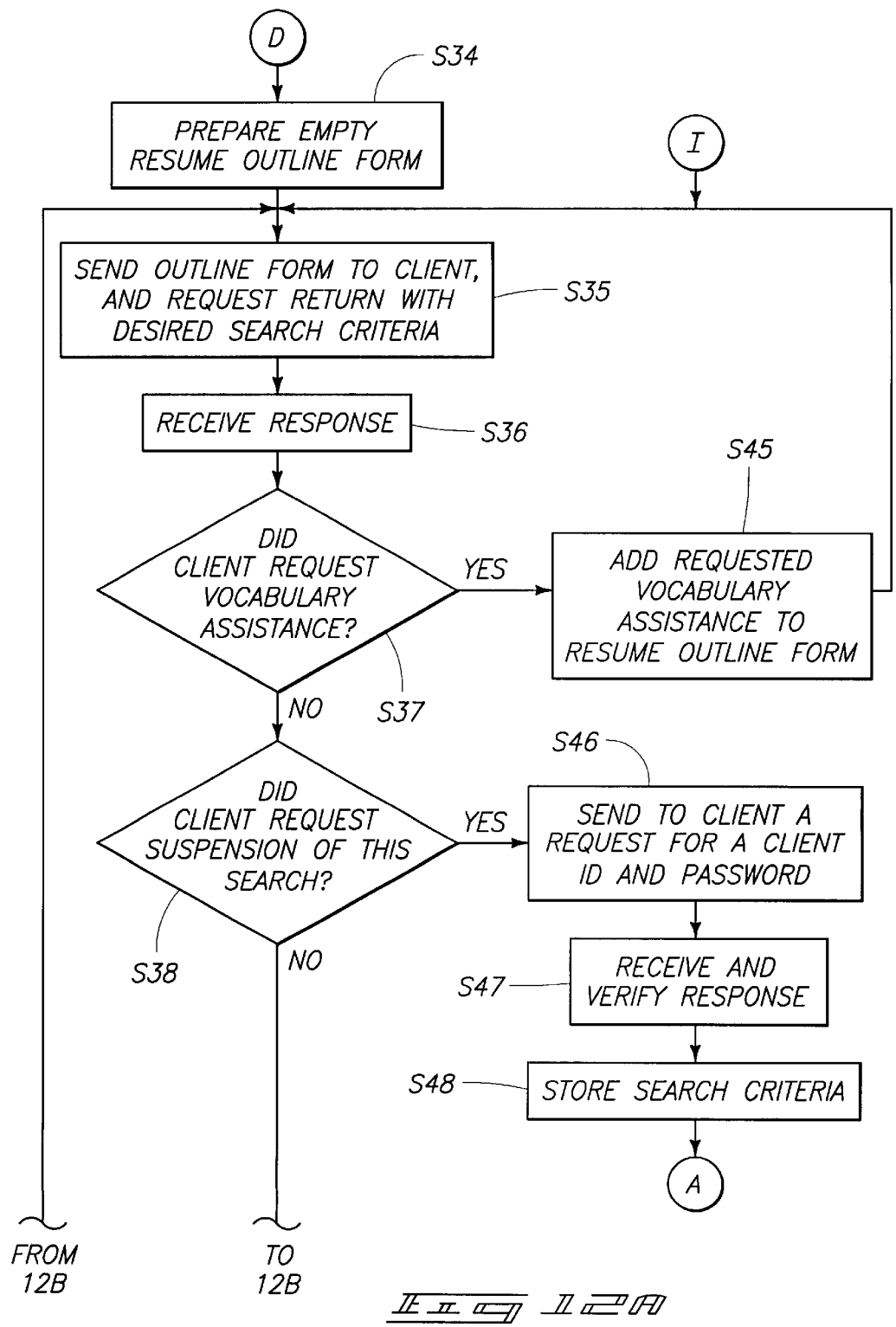

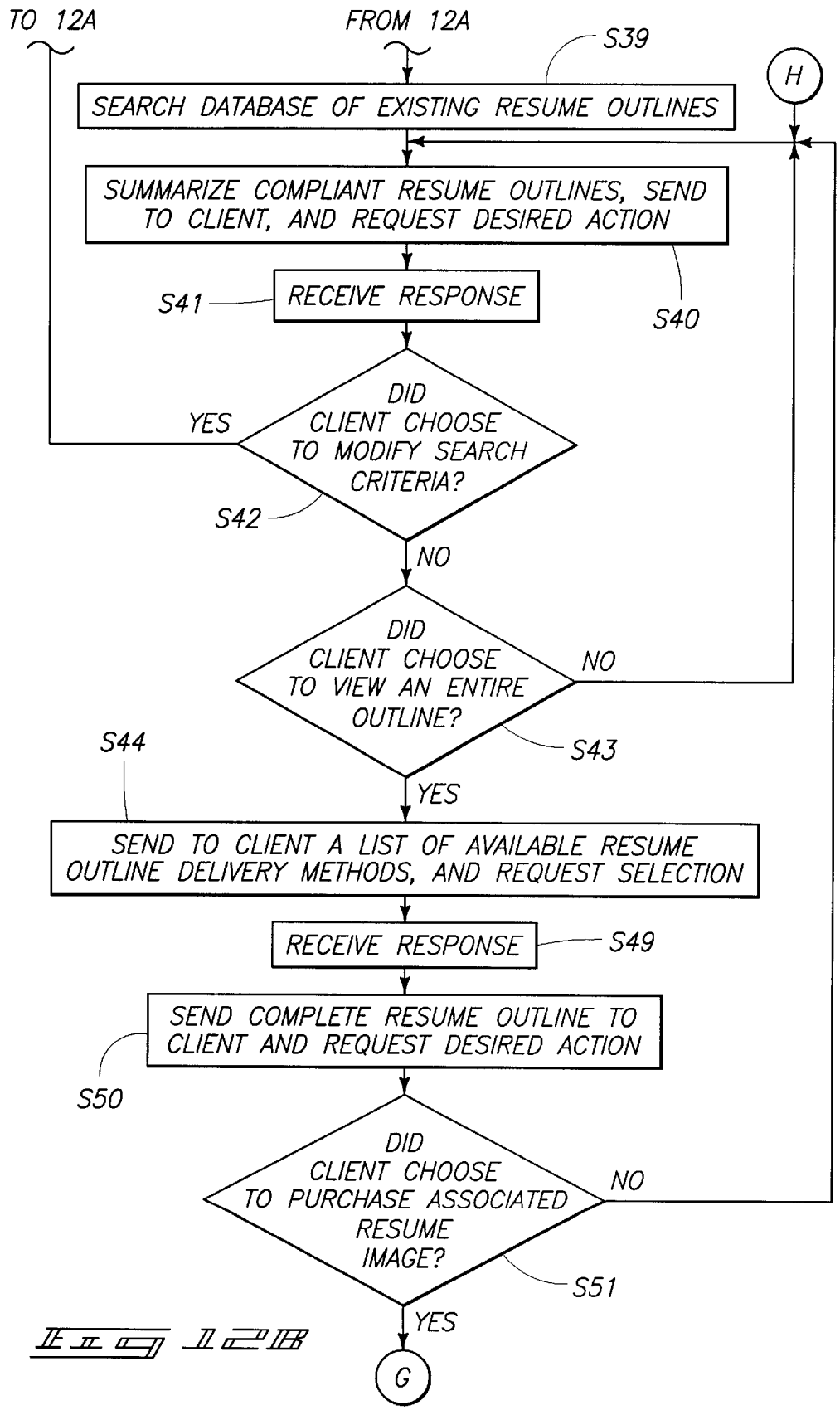

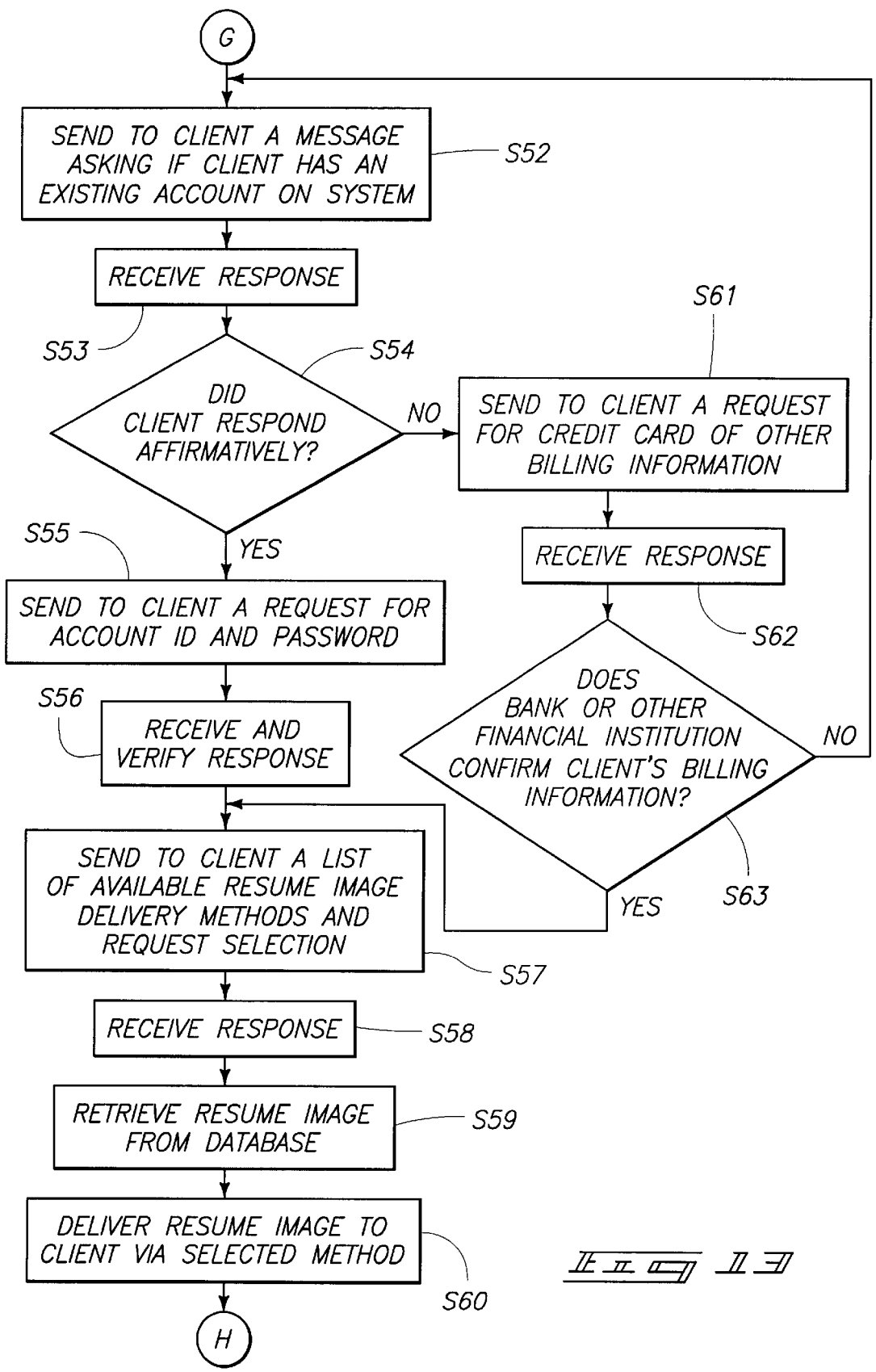

RESUME STORAGE AND RETRIEVAL SYSTEM

CROSS-REFERENCE TO RELATED APPLICATION

This is a continuation of U.S. patent application Ser. No. 10/121,247, filed Apr. 10, 2002, now U.S. Pat. No. 6,564,188 which in turn is a continuation of U.S. patent application Ser. No. 09/054,339, which was filed on Apr. 2, 1998, which a continuation of U.S. patent application Ser. No. 08/597,359, filed Feb. 8, 1996, now U.S. Pat. No. 5,758,324, which in turn claims priority from U.S. Provisional Application Ser. No. 60/008,700, filed Dec. 15, 1995, all of which are incorporated by reference herein.

TECHNICAL FIELD

The invention relates to electronic resumé storage and retrieval systems and methods.

BACKGROUND OF THE INVENTION

Resumés are a primary communication medium between employers and job applicants (candidates). Employers annually spend billions of dollars to solicit resumés using newspaper advertisements, job fairs, college recruitment seminars, and other methods. In response, job applicants spend billions more to compose, typeset, print, and ship those resumés.

Unfortunately, present resumé delivery practices are expensive and frustrating for job applicants. Identifying potential employers, obtaining addresses, producing resumés for each, and finally delivering them is burdensome and time-consuming. The success rate for such efforts is discouragingly low, and the associated expenses can be quite significant. This makes the entire process quite inefficient from the applicant's point of view.

Employers, too, suffer from the inefficiencies of resumé collection and handling. The solicitation, receipt, storage, management, search, and retrieval of dozens, hundreds, and in some cases thousands of resumés can be a difficult, unwieldy, and expensive burden on the employer. Physical, paper-based resumés are often stored in desk drawers and filing cabinets. The numerous limitations of present resumé practices include consumption of substantial physical space; difficulty in searching through large quantities of paper documents; the near-impossibility of correlating applicants whose resumés may vary widely in organization, content, and clarity; and the lack of uniformity in the search process from one practitioner to another.

From the above discussion, it is clear that a very significant need exists for an improved method of resumé solicitation, sorting, delivery, handling, and management. Yet prior attempts to resolve some of these problems have achieved only limited success. Document scanners have been used in some attempts to reduce the physical space consumed by physical resumés. However, search methods do not work well on scanned images because scanned resumés are stored as pictures, not searchable words or text.

Optical Character Recognition (OCR) has been used in some attempts to convert paper-based resumés to pure text. However, employers are typically unwilling to forgo the traditional resumé because of the widely held belief that the ability to review the format, style, and presentation of the resumé itself is of value.

Still other attempts have employed the aforementioned OCR conversion to allow the use of "keyword" search methods on the resulting text of full resumés, in an attempt to find those which contain key words or phrases. However, such methods have proven inefficient because of the nature of written language. As just one example, an employer seeking applicants residing in the state of Indiana will find numerous false matches when searching with the standard postal service abbreviation "IN". The letter pair "in" appears frequently in the English language (many times in this sentence alone), yet most such matches in the full text of a resumé would have little or nothing to do with the searcher's true intent.

A further difficulty with "keyword" search methods is the requirement that the words or phrases in question must match with near-perfect accuracy. The diversity of job applicant writing skills and vocabularies causes many resumés, which otherwise might describe applicants with similar attributes, to be written using very different terms and phrases. Such wide variation causes "keyword" search methods to often erroneously exclude qualified applicants—without notification to ii the searcher—while simultaneously including unqualified ones.

Prior attempts at applying computer technology to resumé management have been limited in scope, applicability, and usefulness. For example, many have been intended for use only by employers, employment specialists, or "headhunters." Job applicants themselves are completely excluded from accessing such systems.

One prior attempt, described in U.S. Pat. No. 5,164,897 to Clark et al. (incorporated by reference), is illustrative. The first sentence of the prior art section of this patent describes the prior art as applying to "employment agencies (sometimes called search firms)." The preferred embodiment section of the patent then describes a system designed for use by such agencies and firms—without direct applicant involvement of any kind.

Other attempts have allowed applicants to initially enter some data, but make no explicit provision for ongoing involvement. Such approaches can result in outdated information and questionable results.

Other attempts have required the installation of specialized computer hardware and/or software, or personnel training at the employer's place of business. The difficulty in learning and using the system often effectively restricts access to just those who have been appropriately "trained."

Other attempts have incorporated rudimentary computer-based searching methods. The most common method involves the aforementioned "keyword" searches on the contents of entire resumés, such as offered by Online Career Center, Indianapolis, Ind. and TMP Interactive, Framingham, Mass. The inherent limitations of such methods have already been discussed.

Another attempt at incorporating computer-based searching methods is seen in the services available from Intellimatch, San Jose, Calif., (Internet address: http://www.intellimatch.com). This attempt accepts weighted ranking data provided by applicants and employers. There are several disadvantages of this type of method: First, the user interface for interacting with such ranking systems can be complex, non-intuitive, unfamiliar, difficult to learn, and slow to operate. Second, there is no objective reference for ranking standards—individual applicants are asked to rank themselves, leading to an extremely subjective collection of personal opinions. Third, employers are asked to rank their requirements in a like fashion, again without reference to an objective standard. Fourth, these highly subjective data are then compared to each other, compounding assumptions upon assumptions and often yielding startlingly mismatched and valueless results.

Another attempt at providing resumé services on the Internet is provided by Beverly Hills Software, 469 South Bedford Drive, Beverly Hills, Calif. 90212, (Internet address: http://www.Bhs.Com). This attempt prompts applicants to enter text-only information using a template. However, keyword searches still involve searching the entire contents of resumé data; no searching by fields is available. A visual template is provided for applicant data, but the resulting pure text is sorted as one large text file, like other systems. There is also no provision for charging or collecting fees.

Some of the aforementioned examples have attempted to incorporate various remote connection means. Such remote methods have traditionally been limited to text-only resumé storage and keyword-based searches of the full resumé text. None have succeeded in addressing all of the problems described above.

SUMMARY OF THE INVENTION

The invention provides a method of and apparatus for storage and retrieval of resumé images in a manner which preserves the appearance, organization, and information content of the original document.

One embodiment of the invention provides a method of and apparatus for storing formatted summaries or "outlines" of resumé images, and efficient searching and subsequent selection of the resumé outlines and their associated resumé images.

One embodiment of the invention provides a user interface for creating the aforementioned resumé outlines which is based on a familiar paper-based method already in common use, thus reducing the training required to effectively use the system.

One embodiment of the invention provides a method of and apparatus for computer-assisted searching of the aforementioned stored resumé outlines in a manner which minimizes the need for specialized equipment and training. In one embodiment, such searches can be suspended, and resumed at a later time.

One embodiment of the invention provides a method of and apparatus for enabling the automatic and continuous execution of the searches through resumé outlines, thereby determining when a potentially qualifying applicant has entered their resumé outline and resumé image and enabling employers to be automatically notified thereof.

One embodiment of the invention provides a method of and apparatus for coordinating the terminology and vocabulary used by applicants and potential employers in the entry and searching of the aforementioned resumé outlines.

One embodiment of the invention provides a method of and apparatus for the controlled expansion of the terminology and vocabulary used by applicants and potential employers in the entry of and searching of the aforementioned resumé outlines.

One embodiment of the invention employs modern communications systems, such as the Internet, the "World Wide Web", or other commercial "connectivity services", for applicant submission of outlines or resumé images, or employer searches through outlines or viewing of resumé images.

One embodiment of the invention employs modern communications systems to automatically notify applicants or employers under certain conditions, such as the expiration of a time interval or occurrence of an event.

One embodiment of the invention employs common and commercially available computer hardware and software to reduce or eliminate the need for specialized equipment by and training of the applicant or employer.

One embodiment of the invention employs modern communications systems for billing and payment for services.

Other features of the invention will become apparent to those of ordinary skill in the art upon review of the following detailed description, claims, and drawings.

BRIEF DESCRIPTION OF THE DRAWINGS

Preferred embodiments of the invention are described below with reference to the following accompanying drawings.

FIG. 3 is an example of a resumé outline form sent from the server of FIG. 2 to an applicant's client machine included in the system of FIG. 1.

FIG. 4 is an example of a search request form sent from the server of FIG. 2 to an employer's client machine included in the system of FIG. 1.

FIG. 7 is an example of a resumé image stored by the server of FIG. 2.

FIGS. 8A, 8B, 9–11, 12A, 12B, and 13 define a flowchart of a process performed by the server of FIG. 2. in accordance with one embodiment of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
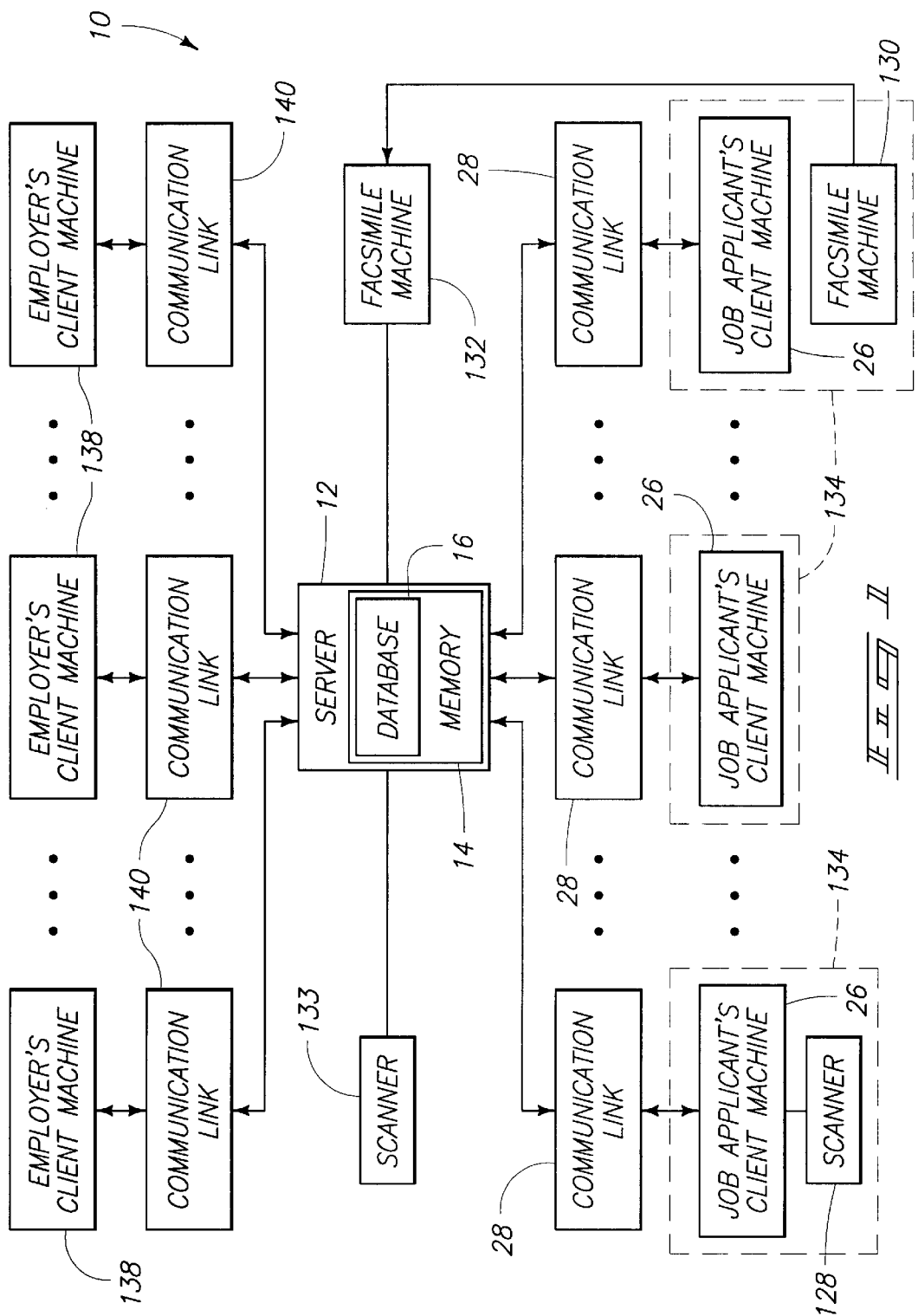
FIG. 1 is a block diagram illustrating a system embodying the invention.
Figure 2:
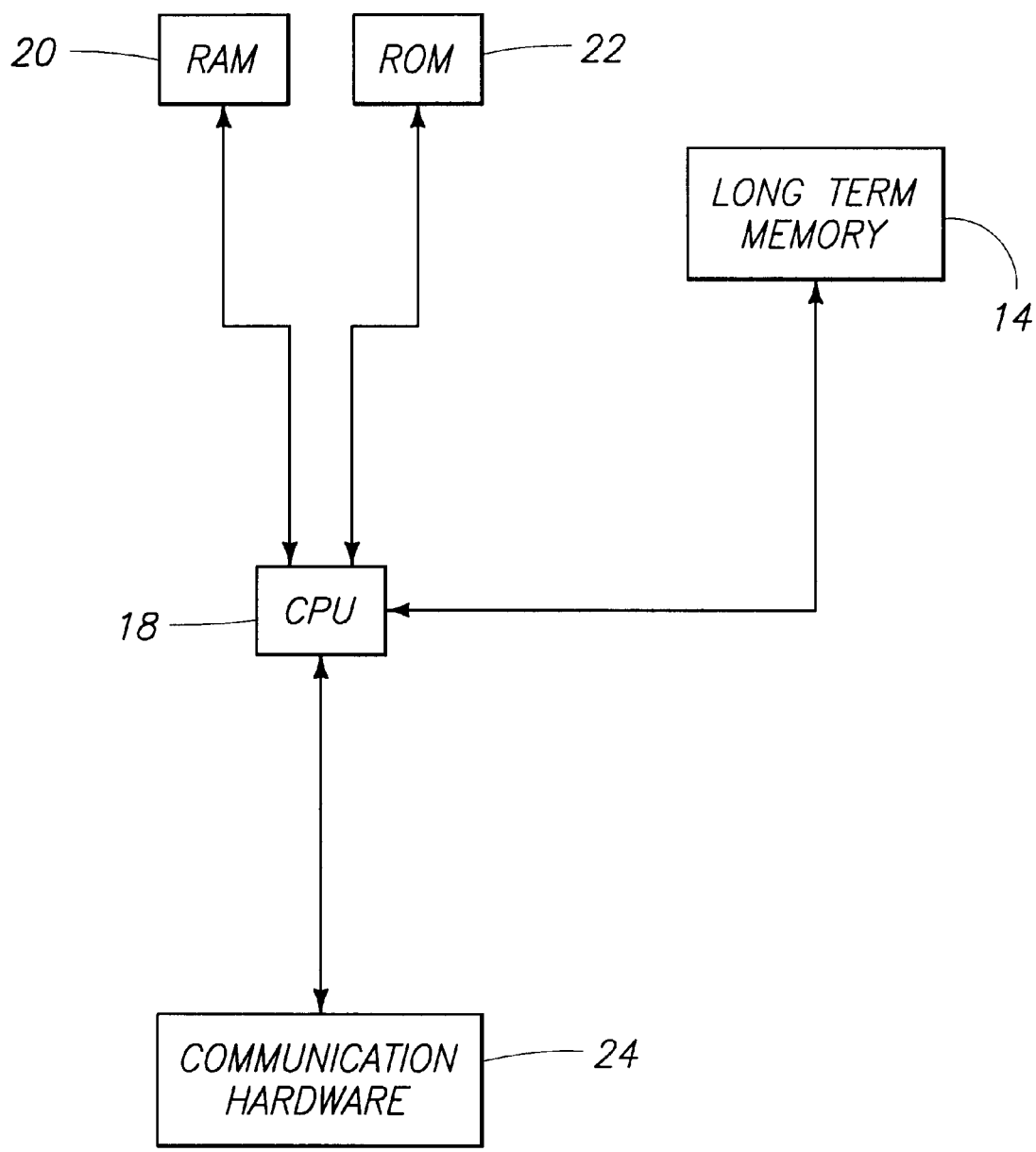
FIG. 2 is a block diagram of a server included in the system shown in FIG. 1.

FIG. 1 shows a resumé storage and retrieval system 10 embodying the invention. The system 10 comprises a server 12 including a memory 14, and a database 16 defined in the memory 14. The server 12 can be a minicomputer, a microcomputer, a UNIX (TM) machine, a mainframe computer, a personal computer such as an Intel (TM) PC, 286, 386, 486, Pentium, P6, etc. (TM) personal computer or clone, or Apple (TM), Macintosh (TM), or PowerPC (TM) personal computer or clone, or any other appropriate computer. The memory 14 is preferably long term memory (e.g. hard drive, disk drive, tape unit, CD-ROM, etc.). The server 12 includes typical components (FIG. 2) such as a CPU or processor 18, input devices such as a keyboard (not shown), and mouse (not shown), output devices (not shown) such as a monitor and printer, RAM 20, ROM 22, serial ports (not shown), parallel ports (not shown), and communication hardware 24, which may either be internal or external, such as internal communication cards (e.g., modem card or network card) or external communication hardware (e.g., external modem), etc. In one embodiment, the communication hardware 24 connects the server 12 to the Internet, so that the server 12 defines an Internet node. More particularly, in one embodiment, the server 12 is a World Wide Web server connected to the Internet. In this embodiment, the server 12 has a multi-user, multi-tasking operating system such as UNIX (if the server is a UNIX machine), Windows NT, LINUX (if the server is a personal computer), etc.

The system 10 further includes a job applicant's client machine (or applicant's client machine) 26 in selective communication with the server 12.

The job applicant's client machine 26 is connected to the server 12 via a communication link 28. Various possible types of communication link can be employed for the communication link 28 between the server 12 and the applicant's client machine 26. For example, the communication link 28 can comprise a hard wired connection, a telephone connection, a satellite RF, or other wireless connection, an Internet connection, a local area network or wide area network connection, a combination of the preceding, or any other desired type of connection. Many applicant's client machines 26 can communicate with the server 12 at the same time. Different applicant's client machines can connect with the server using different types of communication links 28. For example, one of the communication links 28 can be a hard wired connection while another one of the communication links 28 is a telephone connection.

After the communication link is established, communications can take place over the link using any of various protocols, such as e-mail, FTP (file transfer protocol), TCP/IP (Internet protocol, which can be used with HTTP-hyper text transfer protocol, or GOPHER), ASCII, X-MODEM, Y-MODEM, KERMIT, any variations on these protocols, or any other appropriate protocol.

During a session, the server 12 communicates to the applicant's client machine a resumé outline form 30 (FIG. 3) to be completed by a job applicant. The form 30 has a plurality of fields 31 relevant to employment, using which typical information found on a resumé is summarized by the applicant. The form 30 has fields that are similar to blanks found on traditional job application forms available from employers.

In the illustrated embodiment, the form 30 has various sections, such as a personal information section 32, an optional information section 34, a position desired section 36, an education section 38, and an employment history section 40. Other sections can be used, as desired. Each section has various fields 31.

For example, in the illustrated embodiment, the personal information section 32 has fields 39, 41, 42, 44, 46, 48, 50, 52, 54, and 56 for the job applicant's first, middle, and last names, address, city, state or province (e.g., the two letter postal service abbreviations), zip code or postal code, phone number, fax number, and e-mail address, respectively; the optional information section 34 has fields 58, 60, 62 and 64 relating to citizenship, fields 66 and 68 relating to security clearance, and a field 70 for a social security or social insurance number; the position desired section 36 has a field 72 for job title, fields 74, 76, 78, and 80 relating to the type of employment sought (full time permanent, full time temporary, part time permanent, or part time temporary), fields 82, 84, 86, and 88 relating to compensation requirements, and a field 90 relating to the date when the applicant will be available for the new position; the education section 38 has fields 94, 96, 98, 100, 102, 104, 106, and 108 relating to majors, degrees, school names and locations, and grade point averages (multiple copies of fields 100, 102, 104, 106 and 108 can be included for multiple colleges attended); and the employment history section 40 has fields 110, 111, 112, 114, 116, 118, and 120 for employer name, employer city, employer state or province, previous job title, start date for that position, and end date for that position (multiple copies of fields 110, 111, 112, 114, 116, 118, and 120 can be included for multiple prior positions).

Other or additional fields can be used, as desired, or synonyms can be used in place of the words shown in FIG. 3 adjacent the fields. For World Wide Web applications, the form 30 is an HTML form, and has "submit" and "clear" buttons 122 and 124 using which the applicant can either send the information from the filled fields to the server, or can clear the form and start over. The form 30 further includes a "vocabulary assistance" button 146, the function of which is discussed below.

Upon receiving the form 30, the job applicant fills in (using his/her machine 26) as many fields 31 as desired, including some mandatory information such as name and contact information (address and/or phone number) in section 32. The applicant also effects creation of a graphics file 126 (FIG. 7) of the applicant's resumé for receipt by the server.

The graphics file 126 contains all the formatting, fonts, and margins of a traditional paper resumé, and is of great assistance to employers wishing to gain some insight into the professionalism of an applicant. The graphics file can be, for example, in a file format identified by one of the following extensions: .GIF, .TIF (or .TIFF), .JPG (or .JPEG or .JPE), .BMP, .TGA, .EPS, .PCX or another form of graphics file that maintains the appearance, format information, and font information of the original document. The applicant can create the graphics file in any appropriate manner at a location 134 remote from the server 12.

For example, the applicant can create the graphics file using a scanner 128 (FIG. 1), by scanning his or her actual printed resumé. Alternatively, the applicant can use a facsimile machine 130 (FIG. 1) to fax his or her actual printed resumé to a facsimile machine 132 in the possession of the administrator of the system 10 (e.g., located at the location of the server 12). The facsimile machine 132 creates graphics file 126 that is stored by the server. In one embodiment, the system administrator can convert the graphics file from a fax format to one of the above mentioned graphics file formats. Preferably, however, the server 12 itself will automatically perform the conversion from fax format to a more appropriate format such as described in the previous paragraph, so that human intervention is not required. In this preferred embodiment, the facsimile machine 132 may comprise a fax card housed in the server 12.

In another embodiment, the system administrator can receive a mail copy of a printed resumé, and can scan it into the server 12 for the applicant using a scanner 133 in the possession of the system administrator (e.g., located at the location of the server 12).

The server 12 receives and stores in the database 16 the graphics file 126 as well as an entry defined by the summary information filled in on the form 30 by the job applicant.

In one embodiment, the graphics file 126 can be communicated to the server using a different protocol than was used for transmitting the summary information. For example, the summary information can be sent from the applicant's client machine 26 to the server 12 via HTML, and the graphics file 126 can be sent from that applicant's client machine 26 to the server 12 via e-mail. Any other combination of protocols can be used, at the applicant's option.

The form 30 is useful in that it provides searchable information. The information of the graphics file 126 cannot be easily searched. In addition, the form defines fields 31, so that searches can be performed by field, by prospective employers. Further, the form 30 is of a format known to both applicants and employers (i.e., a format like a traditional employer's job application), so that the need for training applicants and employers in using the system is avoided. Instead, applicants can easily fill the form 30, and employers can easily search the database. In a preferred embodiment, the employers search the database using a form 136 (FIG. 4) that is very similar in appearance to the form 30 presented to applicants. The forms 30 and 136 provide a standard framework to be used by all applicants, and all employers.

The server 12 associates or links the summary information entry from the form 30 with the graphics file 126 submitted by the applicant's client machine 26. In other words, if a search by an employer turns up the summary information for a particular applicant, the graphics file 126 containing an image of that applicant's resumé can be easily pulled up as well.

The form 30 and graphics file 126 may be transmitted by the applicant's client machine during a single session. It is also possible that the applicant may fill out and transmit the form 30 during one session, and then upload the resumé image during another session. Or, the applicant could fax a resumé at some later time. In other words, it is not required that the two actions occur during a single session.

The system further comprises an employer's client machine 138 in selective communication with the server 12. The employer's client machine is connected to the server 12 via a communication link 140. Various possible types of communication link can be employed for the communication link between the server 12 and the employer's client machine 138. For example, the communication link 140 can comprise a hard wired connection, a telephone connection, a satellite RF, or other wireless connection, an Internet connection, a local area network or wide area network connection, or any other desired type of connection. Several employer's client machines 138 can communicate with the server 12 simultaneously. Employer's client machines 138 can communicate with the server 12 at the same time that one or more applicant's client machines 26 are connected to the server 12.

Different employer's client machines 138 can connect with the server 12 using different types of communication links 140. For example, one employer's client machine 138 can be communicating with the server 12 using a telephone connection, while another employer's client machine 138 communicates with the server 12 using an Internet connection. Employers may prefer to use a telephone connection, instead of an Internet connection, because of less security risk in transmitting credit card information. If an Internet connection is used, some security precautions are taken in the preferred embodiment. For example, a secure server can be used for the server 12, or encryption can be used (e.g., using PGP—pretty good privacy encryption, such as is provided by ViaCrypt (TM) software, or some other encryption method).

Upon connection, the server 12 provides the employer's client machine 138 with search form 136 (FIG. 4). The search form 136 is preferably similar to the form 30 filled by applicants, as described above, and preferably includes fields 31 corresponding to fields contained on the form filled by applicants. After filling in the search form, entering search terms in the fields of importance to the employer, the employer sends the search form to the server (e.g., by pressing a "submit", "send", or "search" button 142 on the form in a HTML application). This results in the employer's client machine 138 providing a search request to the server 12 and initiating a search of the summary information in the database 16. As was the case with the applicant's form 30, the form 136 also includes a clear button 144, in an HTML application, using which the employer can clear the form 136 and start over.

The search parameters are defined by the filled search form 136. The filled search form 136 indicates which fields 31 are to be searched for which keywords. For example, based on which fields 31 are filled with which keywords, a search query can be constructed which takes the logical "OR" of each word contained in a field, and which takes the logical "AND" of each of the fields 31. Other logical and weighted combinations are possible. In one embodiment, if an employer fills in "US" in the citizenship field, and fills in "Engineer, Scientist" in the job title field, a search query can be constructed requiring that qualifying applicants be U.S. citizens AND be engineers OR scientists. Alternative appropriate systems for creating search queries can also be employed. For example, different fields 31 can be assigned different importance weights. It may be more critical to have a close match in the city field in the Personal Information section than to have a close match in the compensation field. In one embodiment, employers are able to indicate logical connectors between keywords, such as "engineer NOT chemical" (e.g., if an employer is looking for any type of engineer other than a chemical engineer). In a preferred embodiment, the employer can use natural English (without logical connectors), and the server 12 creates an appropriate search query.

Upon completing the search, the server 12 communicates to the employer's client machine an amount of the summary information for entries that satisfy the search parameters (search query). Preferably, contact information (e.g., name, address, phone number, e-mail, fax number, etc.) of qualifying applicants is suppressed at this stage. In one embodiment, the information presented to the employer for each entry that satisfies the search parameters is "summarized" information, for easy and quick review in a standardized, compact, format. An example of summarized information is shown in FIG. 5.

Relevancy ranking is performed in a preferred embodiment. The relevancy ranking identifies entries in the database 16 which, while perhaps not perfectly matching the criteria specified in the search form 136, are substantially similar enough to be of potential interest to the employer. Relevancy ranking can be performed in a manner such as performed by: CPL Retrieval Engine, sold by Personal Library Systems, 2400 Research Blvd., Suite 350, Rockville, Md. 20850; NexTrieve Indexing Engine from Nexial Systems, St. Annastraat 4, 6109 RH, Ohéen Laak, The Netherlands; MetaMorph Text Retrieval Engine sold by Thunderstone Software—EPI Inc., 11115 Edgewater Drive, Cleveland, Ohio 44102; InTEXT Retrieval Engine, sold by InTEXT Systems, 715 Sutter Street, Folsom, Calif. 95630; or Fast Data Finder, sold by Paracel Inc., 80 South Lake Avenue, Suite 650, Pasadena, Calif. 91101, or any other appropriate manner.

Figures 5, 6:
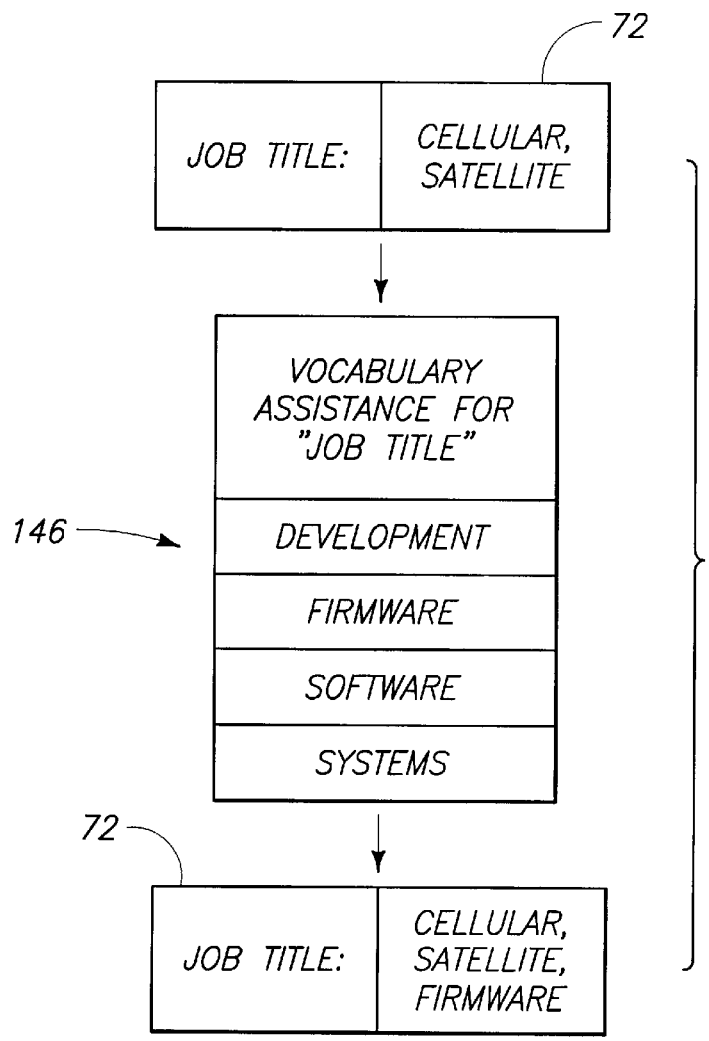
FIG. 5 is an example of a summary of a resumé outline sent from the server of FIG. 2 to an employer's client machine in response to a search request.
FIG. 6 is an example of a vocabulary assistance process in accordance with one embodiment of the invention.
Figure 8A:
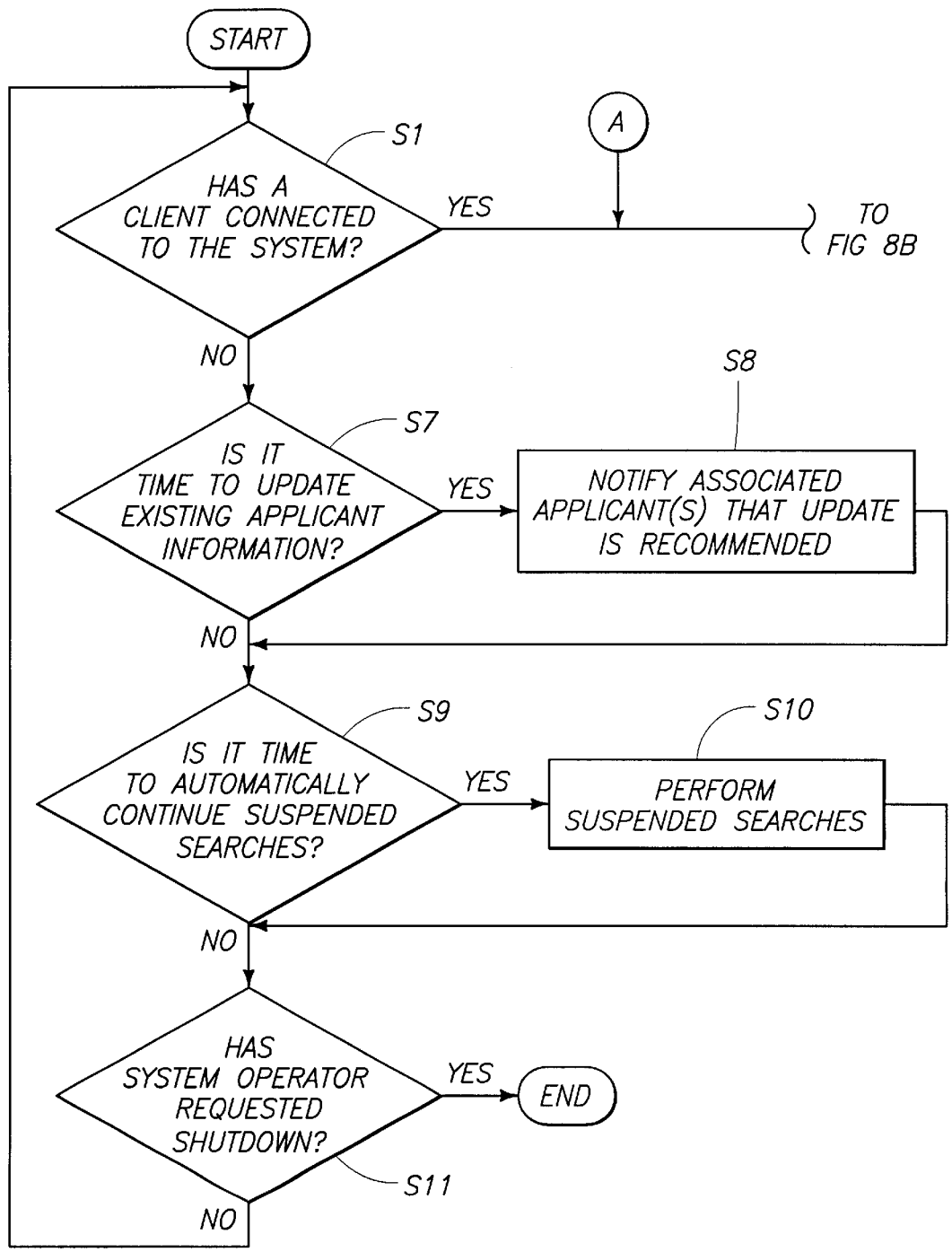
Figure 11:
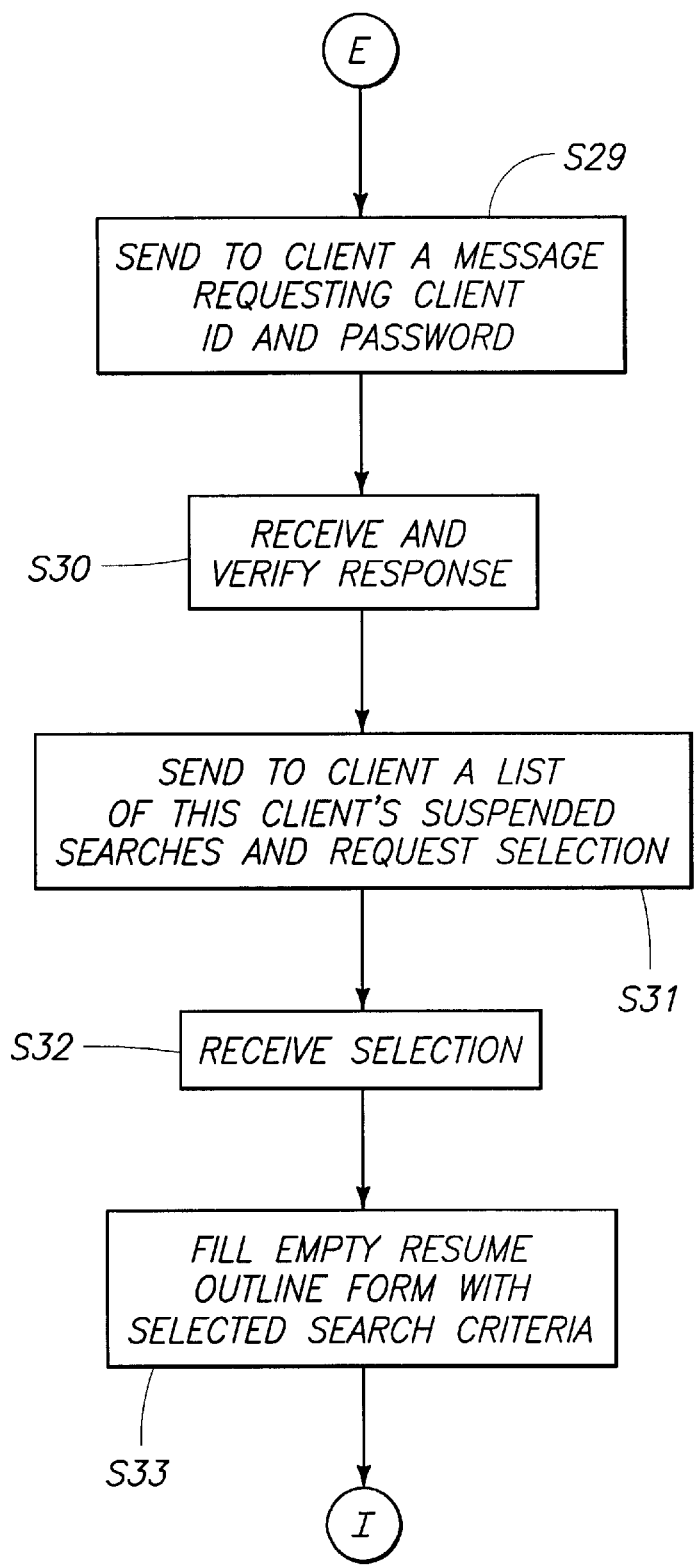

Summarized information (as shown in FIG. 5) is provided for the best matches to the search request, after taking into account the relevancy ranking described above. The maximum number of matches supplied to the employer's client machine can be set to any appropriate number by either the administrator of the system 10, or the employer performing the search. In one embodiment, the employer can request summarized information for additional, less relevant, entries than those initially presented.

The server 12 then queries the employer's client machine as to whether to present graphics files 126 of resumés associated with the entries that satisfy the search parameters. The server does not present the graphics files 126 of the resumés or the contact information for entries that satisfy the search parameters until payment is made or authorized by the employer.

The employer may establish an account, and provide billing information (such as by providing a credit card number) to the administrator of the system 10 at one time, and will then be able to subsequently log in using a password, and order contact information and graphics files without having to again transmit a credit card. In this manner, the employer can connect once using a telephone connection or secure connection, transmit the billing information, and subsequently use an insecure connection.

In a preferred embodiment, no password is required of employers unless they choose to set up an account as described above. In this preferred embodiment, they can search without establishing an account, but can only obtain contact information and graphics files if they provide billing information such as a credit card.

Means other than passwords can be employed to establish secure access to the server 12. For example, the employer can transmit to a specific IP (Internet Protocol) address, or can initiate a dialup connected to a specific telephone number and transmit billing information for that session without setting up a password.

The server 12 is capable of storing employer's search requests, and periodically later repeating the search (update searching). Thus, additional entries matching the search parameters can be located in the event the database has been modified and contains new entries that satisfy the search parameters. If the employer desires the ability to store search requests and perform update searches, he or she will be required by the server 12 to obtain a user name and password, so the employer can be identified by the server in a subsequent connection session.

The server 12 is also capable of suspending execution of a search request upon receiving a suspend request from the employer's client machine, and of resuming the search at a later time upon receiving a resumé request from the employer's client machine 138. For example, the employer may view the summary information for a certain number of "hits" (entries that satisfy the search parameters) and wish to take a break before more closely studying the results, or before looking at less relevant matches. Again, if the employer desires the ability to suspend and later resumé search requests, he or she will be required by the server 12 to obtain a user name and password, so the employer can be identified by the server 12 in a subsequent connection session.

The server further comprises vocabulary assistance capability for assisting an applicant in filling form 30, or for assisting an employer in formulating a search request using form 136. The vocabulary assistance routine provides to the applicant's or employer's client machine alternative terminology which can be selected for filing the form 30 or the form 136.

An example of vocabulary assistance is illustrated in FIG. 6. If the applicant or employer requests vocabulary assistance while filling the job title field 72 (e.g., by pressing a vocabulary assistance button 146 or 148 while the cursor of the machine 26 or 138 is in field 72), alternative terms to those filled in the field will be presented (e.g., by presenting a menu, such as a pop-up menu, to the machine 26 or 138). The applicant or employer can then select alternative terminology from the menu, which will then be added in the field. Alternatively, instead of using the vocabulary assistance while initially filling the form 136, an employer may be dissatisfied with the results of a search, and may then return to the form 136 and initiate vocabulary assistance on one or more of the fields. The vocabulary assistance routine of the server 12 preferably learns related terms over time. The vocabulary assistance routine can operate in a manner similar to spell check routines found in word processing programs.

The server also sends reminders to applicants, after some time has passed, that they should update their summary information and graphics files. This can be via e-mail, or any other desired manner.

FIGS. 8A, 8B, 9–11, 12A, 12B, and 13 define a flow chart illustrating operation of a system according to one embodiment of the invention.

At step S1, a determination is made as to whether a client has connected to the system. If so, the system proceeds to step S2; if not, the system proceeds to step S7.

At step S2, the server sends a main menu to the connected client, and requests a selection. After performing step S2, the system proceeds to step S3.

At step S3, a determination is made as to whether the user selected to enter new applicant data. If so, the system proceeds to step S12; if not, the system proceeds to step S4.

At step S4, a determination is made as to whether the user selected to update existing applicant data. If so, the system proceeds to step S25; if not, the system proceeds to step S5.

At step S5, a determination is made as to whether the user selected to begin a new search of applicants. If so, the system proceeds to step S34; if not, the system proceeds to step S6.

At step S6, a determination is made as to whether the user selected to continue a previously suspended search of applicants. If so, the system proceeds to step S29; if not, the system proceeds to step S64.

At step S7, a determination is made as to whether it is time for an applicant to update the information they have provided to the server. If so, the system proceeds to step S8; if not, the system proceeds to step S9.

At step S8, the server notifies applicants that it is recommended that they update their resumé information. After performing step S8, the system proceeds to step S9.

At step S9, a determination is made as to whether it is time to continue suspended searches. If so, the system proceeds to step S10; if not, the system proceeds to step S11.

At step S10, suspended searches are performed. After performing step 510, the system proceeds to step 511.

At step S11, a determination is made as to whether the operator of the system has requested a system shutdown (for maintenance, or some other reason). If so, the system shuts down; if not, the system proceeds to step S1.

At step S12, a new applicant identification number is assigned by the server, and the server sends to the client a request for a selection of a password. After performing step S12, the system proceeds to step S13.

At step S13, the system receives a response from the client. After performing step S13, the system proceeds to step S14.

At step S14, the server prepares an empty resumé outline form. After performing step S14, the system proceeds to step S15.

At step S15, the server sends the resumé outline form to the connected client, and requests that the applicant fill out the form. After performing step S15, the system proceeds to step S16.

At step S16, the server receives the response from the client. After performing step S16, the system proceeds to step S17.

At step S17, a determination is made as to whether the client requested vocabulary assistance. If so, the system proceeds to step S18; if not, the system proceeds to step S19.

At step S18, the requested vocabulary assistance information is added to the resumé outline form. An example of vocabulary assistance is shown in FIG. 6. For example, if an applicant has listed cellular and satellite in the job title field, and requests vocabulary assistance for the job title field, the server will generate a list of alternative terms such as development, firmware, software, and systems, and will transmit that list to the applicant's client machine. The client can then select any of the listed vocabulary assistance terms for addition to the job title field. Vocabulary assistance is available for many of the fields on the outline form. After performing step S18, the system proceeds to step S15.

At step S19, the server stores the information filled in the resumé outline form in the database. After performing step S19, the system proceeds to step S20.

At step S20, the server sends to the client a list of available resumé image reception methods and requests that the applicant select a method. After performing step S20, the system proceeds to step S21.

At step S21, the server receives the response from the client. After performing step S21, the system proceeds to step S22.

At step S22, the server prepares to receive the resumé image from the client using the selected reception method. After performing step S22, the system proceeds to step S23.

At step S23, the server receives the resumé image. After performing step S23, the system proceeds to step S24.

At step S24, the server stores the resumé image in the database. After performing step S24, the system proceeds to step S2.

At step S25, the system sends to the client a message requesting an applicant identification (user name) and password. After performing step S25, the system proceeds to step S26.

At step S26, the server receives and verifies the password and ID. After performing step S26, the system proceeds to step S27.

At step S27, the server retrieves the existing resumé outline information from the database for this applicant. After performing step S27, the system proceeds to step S28.

At step S28, the server fills the empty resumé outline form with the outline information retrieved from the database. After performing step S28, the system proceeds to S15.

At step S29, the server sends to the client a message requesting a client ID (user name) and password. After performing step S29, the system proceeds to step S30.

At step S30, the server receives and verifies the ID and password. After performing step S30, the system proceeds to step S31.

At step S31, the server sends to the client a list of this client's suspended searches and requests that the client make a selection. After performing step S31, the system proceeds to step S32.

At step S32, the server receives the selection from the client. After performing step S32, the system proceeds to step S33.

At step S33, the server fills the empty resumé outline form with selected search criteria for the suspended search which was selected for execution. After performing step S33, the system proceeds to step S35.

At step S34, the server prepares an empty resumé outline form. After performing step S34, the system proceeds to step S35.

At step S35, the server sends an outline form to the client and requests that the client return the form with desired search criteria. After performing step S35, the system proceeds to step S36.

At step S36, the server receives the response from the client. After performing step S36, the server proceeds to step S37.

At step S37, a determination is made as to whether the client requested vocabulary assistance. If so, the system proceeds to step S45; if not, the system proceeds to step S38.

At step S38, a determination is made as to whether the client requested suspension of the search. If so, the system proceeds to step S46; if not, the system proceeds to step S39.

At step S39, the server searches the database of existing resumé outline information. After performing step S39, the system proceeds to step S40.

At step S40, the server summarizes compliant resumé outlines, sends the summarized outlines to the client, and requests desired action. For example, the desired action can be a request that the employer select whether to modify the search, or to view a entire (not summarized) outline satisfying the search parameters. After performing step S40, the system proceeds to step S41.

At step S41, the server receives the response from the client. After performing step S41, the system proceeds to step S42.

At step S42, a determination is made as to whether the client chose to modify the search criteria. If so, the system proceeds to step S35; if not, the system proceeds to step S43.

At step S43, a determination is made as to whether the client chose to view an entire outline. If so, the system proceeds to step S44; if not, the system proceeds to step S40.

At step S44, the server sends to the client a list of available resumé outline delivery methods, and request selection by the client. After performing step S44, the system proceeds to step S49.

At step S45, requested vocabulary assistance is added to the resumé outline form. After performing step S45, the system proceeds to step S35.

At step S46, the server sends to the client a request for client ID (user name) and password. After performing step S46, the system proceeds to step S47.

At step S47, the server receives and verifies the client ID and password. After performing step S47, the system proceeds to step S48.

At step S48, the server stores the search criteria. After performing step S48, the system proceeds to step S2.

At step S49, the server receives the response from the client. After performing step S49, the system proceeds to step S50.

At step S50, the server sends a complete resumé outline to the client. By "complete resumé outline", what is meant is non-summarized information, in a format such as is shown in FIG. 3, except with contact information suppressed. After performing step S50, the system proceeds to step S51.

At step S51, a determination is made as to whether the client chose to purchase the resumé image associated with the resumé outline that matched the search criteria. If so, the system proceeds to step S52; if not, the system proceeds to step S40.

At step S52, the server sends to the client a message asking if the employer has an existing account. After performing step S52, the system proceeds to step S53.

At step S53, the server receives the response from the client. After performing step S53, the system proceeds to step S54.

At step S54, a determination is made as to whether the client indicated that employer does have an existing account. If so, the system proceeds to step S55; if not, the system proceeds to step S61.

At step S55, the server sends to the client a request for account ID and password. After performing step S55, the system proceeds to step S56.

At step S56, the server receives and verifies the response. After performing step S56, the system proceeds to step S57.

At step S57, the server sends to the client a list of available resumé image delivery methods, and requests selection of one of those methods. After performing step S57, the system proceeds to step S58.

At step S58, the server receives the response from the client. After performing step S58, the system proceeds to step S59.

At step S59, the server retrieves the resumé image from the database. After performing step S59, the system proceeds to step S60.

At step S60, the server delivers the resumé image to the client via the method selected by the employer. After performing step S60, the system proceeds to step S40.

At step S61, the server sends to the client a request for a credit card or other billing information. After performing step S61, the system proceeds to step S62.

At step S62, the server receives the response from the client. After performing step S62, the system proceeds to step S63.

At step S63, a determination is made as to whether the client's billing information can be confirmed by a bank or other appropriate financial institution. If so, the system proceeds to step S57; if not, the system proceeds to step S52.

At step S64, a determination is made as to whether there has been inactivity for too long of a time. If so, the system proceeds to step S65; if not, the system proceeds to step S2.

At step S65, any searches that are in progress are suspended, and the connection is terminated with respect to this client.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A system for handling resume graphic files, comprising:
    a server being configured to receive fields for at least contact information, and resume graphic files which maintain the appearance, format information, and font information of original documents; and
    a client machine in selective communication with the server, the server being configured to communicate to the client machine a resume graphic file upload request, the client machine being configured to selectively transmit, to the server, some of the fields of the contact information and a resume graphic file.

2. A system for handling resume graphic files in accordance with claim 1, wherein the server is configured to receive the resume graphic file, and to transmit the resume graphic file upload request, using TCP/IP.

3. A system for handling resume graphic files, comprising:
    a server being configured to receive outlines including fields for at least contact information, and resume graphic files which maintain the appearance, format information, and font information of original documents, the server being further configured to selectively convert the resume graphics files to alternative formats; and
    a client machine in selective communication with the server, the server being configured to communicate to the client machine a resume graphic file upload request, the client machine being configured to selectively transmit, to the server, an outline and a resume graphic file.

4. A system for handling resume graphic files in accordance with claim 3, wherein the server receives the resume graphic file, and transmits the resume graphic file upload request, using TCP/IP.

5. A system for handling both resume graphic files and resume outlines associated with the resume graphic files, comprising:
    a server being configured to receive at least resume outlines and resume graphic files, which resume outlines include fields for at least contact information, and which resume graphic files maintain the appearance, format information, and font information of original documents; and
    a client machine in selective communication with the server, the server being configured to communicate to the client machine a resume graphic file upload request and a resume outline request, in any order, the client machine being configured to selectively transmit, to the server, information defined by at least a resume graphic file and data from at least some of the fields of the resume outline.

6. A system for handling resume graphic files in accordance with claim 5, wherein the server is configured to use TCP/IP to transmit at least resume graphic file upload requests and resume outline requests.

7. A system for handling resume graphic files in accordance with claim 5, wherein the server is configured to use TCP/IP to receive at least resume graphic files and data from the fields of the resume outline.

8. A system for handling resume graphic files, comprising:
    a server including a memory, and a database defined in the memory, said database being configured to store outlines, and resume graphic files, the resume graphic files being configured to maintain the appearance, format information, and font information of the original documents, and the outlines include fields for at least contact information;
    a first client machine in selective communication with the server, the server being configured to communicate to the first client machine a resume graphic file upload request, the first client machine being configured to selectively transmit, to the server, information defined by an outline and a resume graphic file, the server being further configured to receive and store in the database an entry including the resume graphic file; and
    a second client machine in selective communication with the server, the second client machine being configured to selectively provide a search request, comprising search parameters, to the server to initiate a search of the database, the server being configured to, upon completing the search, communicate to the second client machine an amount of the resume graphic files in response to the search parameters.

9. A system for handling resume graphic files in accordance with claim 8, wherein the server is configured to transmit the resume graphic file upload request, and to receive the resume graphic file, using TCP/IP.

10. A system for handling resume graphic files, comprising:

a server being configured to receive outlines including fields for at least contact information, and resume graphic files which maintain the appearance, format information, and font information of original documents;

a first client machine in selective communication with the server, the server being configured to communicate to the first client machine a resume graphic file upload request, the first client machine being configured to selectively transmit, to the server, information defined by an outline and a resume graphic file; and a second client machine in selective communication with the server, the server being configured to communicate to the second client machine an amount of the resume graphic files.

11. A system for handling resume graphic files in accordance with claim 10, wherein the server is configured to receive the resume graphic file, and to transmit the resume graphic file upload request, using TCP/IP.

\* \* \* \* \*

UNITED STATES PATENT AND TRADEMARK OFFICE
CERTIFICATE OF CORRECTION

PATENT NO. : 6,718,345 B2
DATED : April 6, 2004
INVENTOR(S) : Richard L. Hartman et al.

It is certified that error appears in the above-identified patent and that said Letters Patent is hereby corrected as shown below:

Column 2,
Line 20, please delete "ii" after "to".

Column 8,
Line 51, please delete "Md." after "Rockville," and insert -- MD --.
Line 52, please delete "Ohéen" after "6109 RH," and insert -- Ohe` en --.

Column 9,
Line 57, please delete "filing" after "for" and insert -- filling --.

Column 10,
Line 49, please delete "510" after "step" and insert -- S10 --.
Line 49, please delete "511" after "step" and insert -- S11 --.

Signed and Sealed this

Twenty-first Day of September, 2004

JON W. DUDAS
*Director of the United States Patent and Trademark Office*